UNITED STATES PATENT OFFICE.

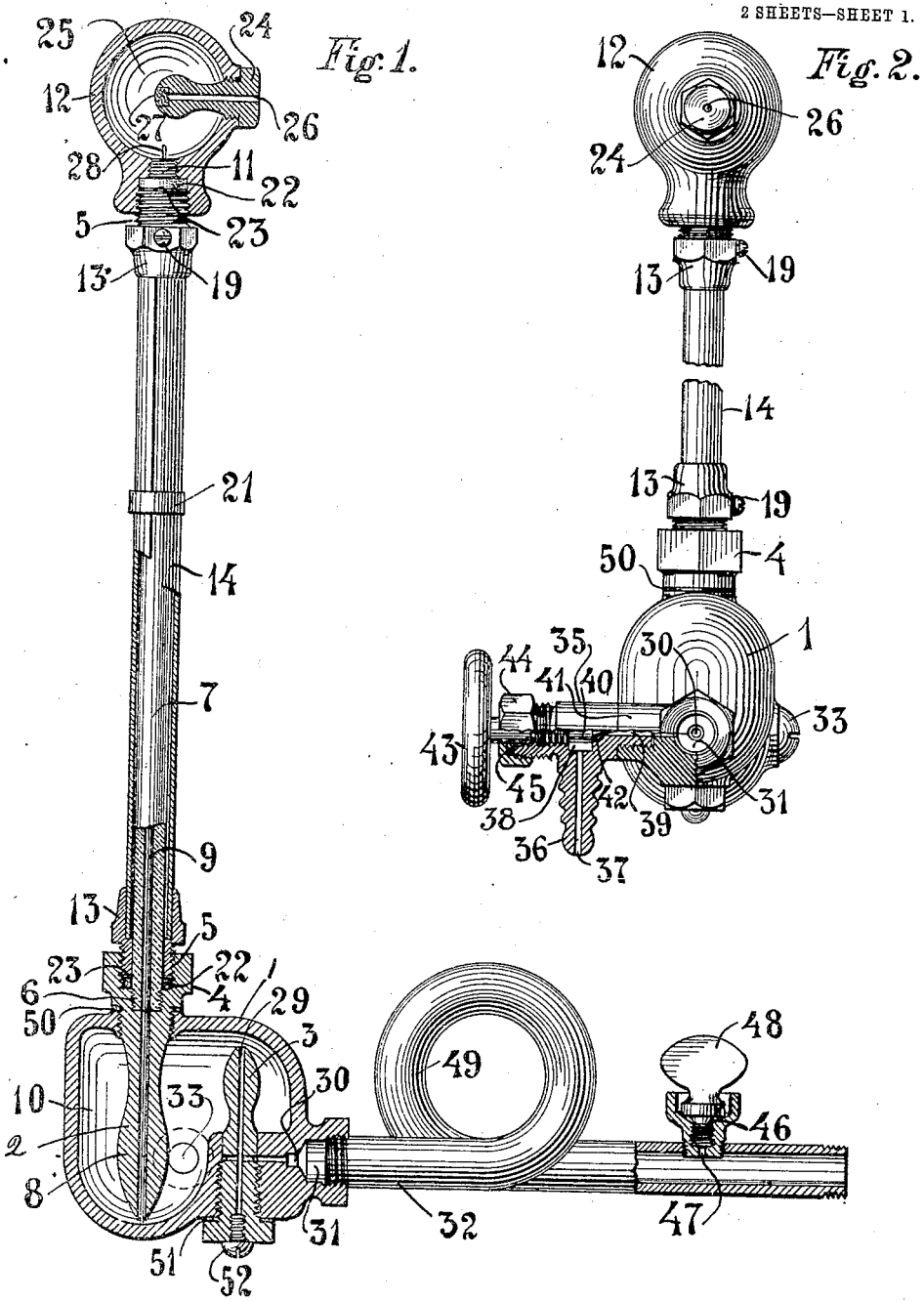

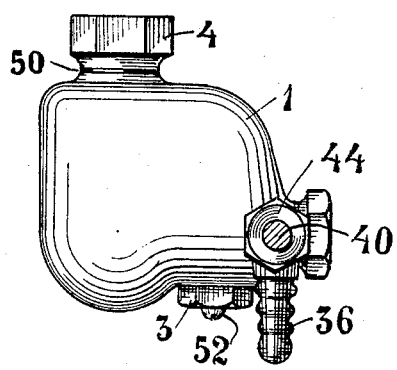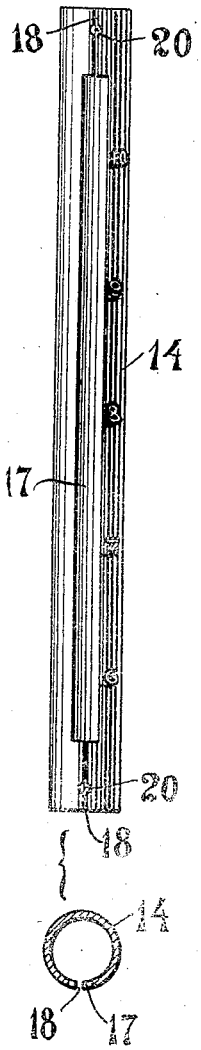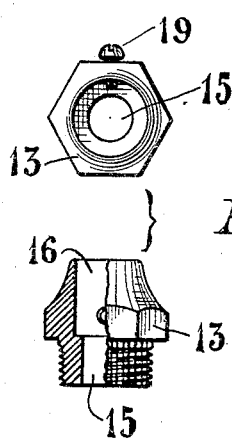

GEORGE W. HEILAND, OF NEW YORK, N. Y.

DEVICE FOR TESTING PLUMBING AND PIPES.

No. 903,973.  Specification of Letters Patent.  Patented Nov. 17, 1908.

Application filed May 21, 1907. Serial No. 374,337.

*To all whom it may concern:*

Be it known that I, GEORGE W. HEILAND, a citizen of the United States, and resident of the city of New York, in the county of New York and State of New York, have invented certain new and useful Improvements in Devices for Testing Plumbing and Pipes, of which the following is a specification.

This invention relates to devices for testing plumbing and pipes and has for its object the provision of means by which leaks in pipes may be detected and located. Such devices are in the trade generally designated as "mercury columns", owing to the use of a column of mercury to indicate the pressure of air pumped into the pipes to be tested. The falling of the mercury indicates that a leak exists.

By introducing a volatile fluid of penetrating odor, such as ether, into the pipes where it will evaporate and escape through the leak the location of said leak may be determined by the odor. In the drawing an effective device of this kind is shown which consists of a mercury reservoir, a transparent tube ascending from the same, means for connecting the chamber to the pipes to be tested, means for introducing an air pressure into said chambers and means for introducing ether into the pipes under test.

Owing to the rough usage to which a device of this kind is subjected the transparent tube which contains the column of mercury must be made of an unbreakable material, and therefore glass can not be used. A suitable material has been found in celluloid composition known as "gelo-celu," but even a tube of such material must be protected from mechanical injury by means of a metal guard, having a slot to allow observation of the mercury column. As now the testing sometimes must be performed in dark corners, it is of vital importance that said guard allows the mercury to be observed from that side best illumined. Furthermore, as the ether has a tendency to destroy the celluloid composition, said fluid must be prevented from entering the mercury reservoir. In addition to these things means must be provided to prevent the spilling of mercury out of the device and to prevent leaks in the device itself which would render the results of the test unreliable.

In the device hereinafter described and shown in the accompanying drawings as an illustration of one embodiment of my invention, I have sought to obtain the aforesaid objects and evade the obstacles set forth in a simple and effective manner.

Other objects and results obtained will in part appear hereinafter and in part be obvious from the description of the device illustrated in the drawings, in the several views of which like parts have been given similar reference numbers.

Figure 1 is a side elevation of a device partially in section. Fig. 2 is a front elevation of the device partially in section. Fig. 3 is a side elevation of the mercury reservoir. Figs. 4 to 7 are detail views of parts of the device.

In said figures, at 1 is represented a reservoir for the mercury. This reservoir or mercury cup has two detachable tubular columns or nipples 2 and 3 threaded into the walls of said cup. The reversed column 2 has a hexagon head 4 having two consecutive cylindrical recesses 5 and 6, both provided with female threads.

A "gelo-celu" tube 7 has its lower threaded end screwed into the recess 6 so that a solid connection is established between said tube and the nipple. A bore 8 in said nipple serves to connect the bore 9 of said tube with the hollow chamber 10 of the mercury-cup. The upper end of the tube 7 is in the same manner solidly connected to an upper reservoir 12 having threaded recesses like those of the head 4. Screwed into these recesses at the reservoir is the threaded end of a grooved shoulder ferrule 13, which serves as rest for the guard 14.

The ferrule has, as may be seen from the detail view Fig. 7, a bore 15 of a size corresponding to the diameter of the tube 7 and a wider bore or recess 16 of a diameter corresponding to that of the guard 14. The guard is a spring brass tube (see Fig. 5) having a slot 17 adapted to allow the observation of the mercury column and is split at the ends at 18, so as to allow the same to resiliently fit to the ferrules 13, allowing the guard to swivel. The ferrule is provided with a set of screws 19 for holding the guard in a permanent position when required, and a hole 20 is provided at each end of the guard to receive the end of this screw.

The slotted guard is scaled and numbered for the heights of mercury corresponding to the range of pressure under which the pipes may be tested. A split ring 21 surrounding the guard 14 is used for the purpose of sliding up or down to the height of the mercury plainly indicating the distance the mercury has fallen.

In order to obtain a perfectly tight connection between the gelo-celu tube and the reservoirs a rubber packing 22 surrounding each end of the tube is provided between the bottom of the recess 5 and their respective ferrules 13. A metal jam washer 23 interposed between the packing and the ferrule serves merely to prevent friction between the packing and the ferrules, while the device is being put together.

The upper reservoir or cup 12, of globular shape is used for receiving the overflowing mercury when the mercury column reaches the upper end of the tube 7. It is provided with a nipple 24 screwed into the wall of the cup. This nipple extends to a point near the center of the hollow chamber 25 of said cup and has a bore 26 through which the air can escape. Owing to the peculiar design of the overflow cup no mercury can be spilled out of the same regardless what position the device may take. To further insure against spilling of the mercury and to regulate the escape of air through the bore 26 a washer 27 of felt or other suitable porous material is counter sunk into the inner end of the nipple 24.

To guide the mercury in the tube 7 and thus prevent the development of air bubbles in the column a wire 28 is inserted in said tube extending from the bottom of the mercury cup up to the overflow cup.

The mercury cup 1 has as before mentioned a second nipple 3 extending from the bottom of the cup to a point near the top of the same. The object of this nipple is to allow the introduction of an air pressure into the hollow chamber 10 for which purpose it is provided with a bore 29 which bore is in connection with the air channel 30. The peculiar construction of the mercury cup with both its nipples prevents the mercury from being spilled out through said channel which widens into an outlet 31 provided with a female thread to receive the tube 32 which is adapted to connect the mercury cup with the pipes to be tested. A filling screw 33 is provided at one side of the mercury cup for letting in the mercury. The said air channel 30 communicates with the bore 39 Fig. 2 of an air valve consisting of a tubular casting 35 screwed into the projection 41 of the mercury cup 1, having a seat 42 for the pointed end of a threaded valve spindle 40 screwed into the female threads of the tubular castings, an air channel 38 and a hose end 36 having a bore 37 communicating with said air channel. The valve is in the usual manner provided with a bonnet 44 containing a packing 45 to prevent leaking of air and the spindle 40 may be turned by means of a hand wheel 43.

The bore end 36 is adapted to be connected to an air pump, not shown in the drawing, by means of a rubber hose.

The before mentioned tube 32 which is adapted to be connected to the pipes to be tested is provided with the following means for allowing the introduction of ether into the pipes: A cup shaped vessel 46 is screwed into the wall of the tube and has an opening 47 through which ether can be poured into the tube. A valve screw 48 is provided for closing said opening after the introduction of the ether. In order to prevent said fluid from flowing back into the mercury chamber where it, as before mentioned, would cause damage, the tube 32 is bent in shape of a single turn of a coil forming a kind of trap 49 in the trade known as a siphon.

The operation of the device is as follows: After the mercury cup has been filled with mercury to a level indicated by the filling screw and the device has been tightly connected to the pipes to be tested the ether screw 48 is removed and ether poured into the cup 46, whereupon the screw is replaced. The hose end 36 of the device is now connected to an air pump by means of a rubber hose, the air valve is opened by turning the wheel 43 and air is pumped into the device and the pipes until the mercury in the tube 7 reaches the height which corresponds to the pressure for which said pipes shall be tested. The air pressure forces the ether into the plumbing where it evaporates. The air valve is now shut off and the mercury column observed. If any leak exists in the plumbing the mercury will fall more or less rapidly and the extent of this leak can be judged by the rate of said falling. The location of the leak is then detected by the smell of the evaporated ether escaping through the leak.

To prevent leaks in the device itself packings 50 and 51 are employed to make perfectly tight connections between the mercury cup 1 and the detachable nipples 2 and 3. These nipples could be cast in one piece with the mercury cup but the arrangement shown is preferred as it facilitates the casting as well as the cleaning of the device. For the last named reason the bore 29 of the nipple 3 is extended to the bottom of the nipple where it is closed by the cleaning out screw 52.

From the above description of one embodiment of my invention and the accompanying drawings illustrating the same it will be seen that said embodiment fulfils all the requirements set forth. Thus a device is obtained which is not easily injured, due to the material used for the mercury tube, and the manner in which the same is protected, where said tube cannot slip off from the reservoirs due to the solid manner in which it is connected to the same, where no mercury can escape owing to the peculiar trap-like construction of the mercury and overflow reservoirs with their nipples and where finally the volatile fluid cannot enter the mercury cup and tube due to the provision of the ether trap or siphon.

As many changes could be made in the construction and many apparently widely different embodiments of my invention designed without departing from the scope thereof, I intend that all matter contained in the above description or shown in the accompanying drawings shall be interpreted as illustrative merely of an operative embodiment of my invention and not in a limiting sense.

What I claim is:—

1. In a device for testing a piping system, the combination of a pair of reservoirs, one upper and one lower, a transparent tube uniting said reservoirs, a nipple in said upper reservoir extending from the wall of said reservoir to a point near the center of the same, a bore in said nipple and a recess in the same connected to said bore, and a packing of porous material positioned in said recess adapted to prevent mercury from escaping but adapted to allow air to pass through said bore.

2. In a device for testing a piping system, the combination of a reservoir adapted to contain mercury, a tube connected to said reservoir, a nipple detachably connected to said reservoir and extending from the upper part thereof to a point near the bottom of the same, said nipple having a bore forming a continuation of the bore of said tube and adapted to permit the mercury to ascend into said tube, a nipple detachably connected to said reservoir and extending from the bottom to a point near the top of the same and adapted to permit the introduction of an air pressure into said reservoir to force the mercury up into said tube.

3. In a device for testing a piping system, the combination of a pair of reservoirs, one upper and one lower, a transparent tube uniting said reservoirs and solidly connected thereto, the lower reservoir being adapted to contain mercury to be forced up into the tube as a column, and the upper reservoir being adapted to receive the overflowing mercury when the mercury column reaches the upper end of the tube, a nipple descending from the top of said lower reservoir to a point near the bottom of the same and having a bore forming a continuation of the bore of the transparent tube to permit the mercury to pass up into said tube when an air pressure is exerted upon the surface of the mercury in said reservoir, a nipple ascending from the bottom of said reservoir to a point near the top of the same and having a bore permitting air pressure to be introduced into said reservoir.

4. In a device for testing a piping system, the combination of a reservoir adapted to contain mercury, a tube ascending from said reservoir, means adapted to allow the mercury to ascend into said tube when an air pressure is exerted upon its surface, a tube adapted to connect said reservoir with the piping system to be tested, means adapted to permit introduction of a volatile fluid into said tube, said tube being bent so as to form one turn of a coil located between said fluid introducing means and the reservoir so as to prevent the fluid from entering said reservoir, and means for introducing an air pressure into said reservoir and said tube, said means being located between the reservoir and said coil.

5. In a device for testing a piping system, in combination, a pair of reservoirs, a tube of unbreakable material connecting said reservoirs, the lower reservoir being adapted to contain mercury to be forced up into said tube by air pressure and the upper reservoir being adapted to receive any overflowing mercury from said tube, one end of said tube being surrounded and protected by a jacket from the fumes of the ether, means for introducing an air pressure into said lower reservoir, a tube having a portion formed in a coil for connecting said lower reservoir with the piping system under test, and means for introducing ether fumes into said piping system.

6. In a device for testing a piping system, the combination of a lower reservoir having a detachable nipple descending from the top to a point near the bottom of the same, an upper reservoir of globular shape, a detachable nipple connected thereto and ending near the center of said upper reservoir, said nipple having a bore to allow air to escape and a recess at the inner end thereof, a porous packing positioned in said recess adapted to prevent mercury from escaping through said bore, a tube of transparent unbreakable material uniting the upper reservoir and the nipple of the lower reservoir and solidly connected thereto by means of threaded connections, said nipple having a bore forming a continuation of the bore in said tube, a ferrule surrounding each end of said tube, packing positioned between said ferrule and its seat, a guard for said tube rotatably mounted in said ferrules, a ring slidably mounted upon said guard, a nipple ascending from the bottom to a point near the top of said lower reservoir detachably connected thereto and adapted to provide a connection between the same and the piping system to be tested, a tube bent so as to form one turn of a coil and detachably connected to said lower reservoir, a cup attached to said tube on the side of the coil away from the reservoir, said cup having a bore connecting the same with said tube, said last named nipple having a bore communicating with the bore of the tube, and a valve attached to and communicating with said lower reservoir having a hose-end adapted to receive a tube from an air pump.

Signed at New York city in the county of New York and State of New York this 7th day of May A. D. 1907.

GEORGE W. HEILAND.

Witnesses:
LEWIS J. DOOLITTLE,
PAUL R. HEILAND.